(12) United States Patent
Liu

(10) Patent No.: US 12,287,891 B2
(45) Date of Patent: Apr. 29, 2025

(54) METHOD FOR ACCESSING APPLICATION AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Jiajun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 637 days.

(21) Appl. No.: 17/698,774

(22) Filed: Mar. 18, 2022

(65) Prior Publication Data

US 2022/0207164 A1 Jun. 30, 2022

Related U.S. Application Data

(63) Continuation of application No. PCT/CN2020/123068, filed on Oct. 23, 2020.

(30) Foreign Application Priority Data

Mar. 18, 2020 (CN) .......................... 202010188564.8

(51) Int. Cl.
*G06F 21/62* (2013.01)
*G06F 21/45* (2013.01)
*G06F 21/60* (2013.01)

(52) U.S. Cl.
CPC .............. *G06F 21/62* (2013.01); *G06F 21/45* (2013.01); *G06F 21/602* (2013.01)

(58) Field of Classification Search
CPC ...... G06F 21/121; G06F 21/335; G06F 21/45; G06F 21/602; G06F 21/62;

(Continued)

(56) References Cited

U.S. PATENT DOCUMENTS 10,250,613 B2 4/2019 Liu
10,356,088 B1 7/2019 Peddada et al.
(Continued)

FOREIGN PATENT DOCUMENTS

CN 101350717 A 1/2009
CN 101465735 A 6/2009
(Continued)

OTHER PUBLICATIONS

Hardt, Dick (ed), "RFC6749—The OAuth 2.0 Authorization Framework", Internet Engineering Task Force. (Oct. 2012) (Year: 2012).*
(Continued)

*Primary Examiner* — Theodore C Parsons
(74) *Attorney, Agent, or Firm* — ANOVA LAW GROUP, PLLC

(57) ABSTRACT

Disclosed is a method for accessing software applications. The method includes obtaining an application access request, the application access request carrying a user identifier and an application identifier; acquiring an encryption key, and encrypting the user identifier by the encryption key, to obtain an encrypted user identifier, the encryption key carrying first key information and second key information; generating an authorization credential corresponding to the application access request according to the encrypted user identifier and the first key information; transmitting the authorization credential to the application that is to be accessed, the application that is to be accessed generating an authorization request based on the authorization credential; receiving the authorization request returned by the application that is to be accessed; and accessing, when the authorization request satisfies a preset condition, the application that is to be accessed based on the second key information.

20 Claims, 8 Drawing Sheets

(58) Field of Classification Search
CPC ............. H04L 2209/42; H04L 63/0407; H04L 63/0428; H04L 63/0807; H04L 63/0884; H04L 63/10; H04L 9/085; H04L 9/0894; H04L 9/14; H04L 9/3213; H04W 12/02; H04W 12/084
See application file for complete search history.

(56) References Cited

U.S. PATENT DOCUMENTS

| | | | |
|---|---|---|---|
| 2014/0289839 | A1 | 9/2014 | Chen et al. |
| 2015/0206139 | A1* | 7/2015 | Lea ..................... G06Q 20/382 705/44 |
| 2018/0337907 | A1* | 11/2018 | Bhansali ............... H04L 9/3231 |
| 2019/0334718 | A1* | 10/2019 | Li ......................... H04L 9/3226 |

FOREIGN PATENT DOCUMENTS

| | | |
|---|---|---|
| CN | 103166783 A | 6/2013 |
| CN | 103179114 A | 6/2013 |
| CN | 104901862 A | 9/2015 |
| CN | 105577691 A | 5/2016 |
| CN | 106487763 A | 3/2017 |
| CN | 104967597 B | 5/2018 |
| CN | 108733991 A | 11/2018 |
| CN | 110213195 A | 9/2019 |
| CN | 110881015 A | 3/2020 |
| CN | 111064757 A | 4/2020 |
| EP | 2345975 A1 | 7/2011 |

OTHER PUBLICATIONS

Jones, Michael; Hardt, Dick (eds), "RFC6750—The OAuth 2.0 Authorization Framework: Bearer Token Usage", Internet Engineering Task Force (Oct. 2012) (Year: 2012).*
European Patent Office European Search Report for Application No. 20925036.4-1218 Nov. 7, 2022 66 pages.
The State Intellectual Property Office of the People's Republic of China (SIPO) Office Action 1 for for 202010188564.8 May 7, 2020 9 Pages (including translation).
The World Intellectual Property Organization (WIPO) International Search Report for PCT/CN2020/123068 Jan. 26, 2021 6 Pages (including translation).

* cited by examiner

METHOD FOR ACCESSING APPLICATION AND APPARATUS, ELECTRONIC DEVICE, AND STORAGE MEDIUM

RELATED APPLICATIONS

This application is continuation application of PCT Application No. PCT/CN2020/123068, filed on Oct. 23, 2020, which claims priority to Chinese Patent Application No. 202010188564.8 filed with the China National Intellectual Property Administration on Mar. 18, 2020 and entitled "METHOD FOR ACCESSING APPLICATION AND APPARATUS, ELECTRONIC DEVICE, AND STORAGE MEDIUM". The two applications are incorporated herein by reference in their entirety.

FIELD OF THE TECHNOLOGY

This application relates to the field of computer technologies, and specifically, to a method for accessing an application and apparatus, an electronic device, and a storage medium.

BACKGROUND OF THE DISCLOSURE

With the development of Internet technologies, more and more users use instant messaging applications to conduct social activities such as chatting with relatives and friends. When using these applications, users may access third-party applications in these applications to perform operations such as viewing data, browsing news, or shopping.

Often, a user accesses a third-party application in an application by authorizing the third-party application. However, in the conventional method for accessing an application, when the third-party application is not authorized to access the application, data of the user may be maliciously pulled by implanting a virus to access the third-party application in the application, which decreases the security of accessing the application.

SUMMARY

According to various embodiments provided in this application, a method for accessing an application and apparatus, an electronic device, and a storage medium are provided.

One aspect of the present disclosure provides a method for accessing an application performed by an electronic device. The method includes obtaining an application access request, the application access request carrying a user identifier and an application identifier, the application identifier corresponding to the application that is to be accessed; acquiring an encryption key, and encrypting the user identifier by using the encryption key, to obtain an encrypted user identifier, the encryption key carrying first key information and second key information; generating an authorization credential corresponding to the application access request according to the encrypted user identifier and the first key information; transmitting the authorization credential to the application that is to be accessed, the application that is to be accessed generating an authorization request based on the authorization credential; receiving the authorization request returned by the application that is to be accessed; and accessing, when a detection result of the authorization request satisfies a preset condition, the application that is to be accessed based on the detection result and the second key information.

Another aspect of the present disclosure provides an application access apparatus, including: an obtaining module, configured to obtain an application access request, the application access request carrying a user identifier and an application identifier, the application identifier corresponding an application that is to be accessed; an acquisition module, configured to acquire an encryption key, and encrypt the user identifier by using the encryption key, to obtain an encrypted user identifier, the encryption key carrying first key information and second key information; a generation module, configured to generate an authorization credential corresponding to the application access request according to the encrypted user identifier and the first key information; a transmission module, configured to transmit the authorization credential to the application that is to be accessed, the application that is to be accessed generating an authorization request based on the authorization credential; a receiving module, configured to receive the authorization request returned by the application that is to be accessed; and an access module, configured to access, when a detection result of the authorization request satisfies a preset condition, the application that is to be accessed based on the detection result and the second key information.

A non-transitory storage medium storing computer-readable instructions is provided, the computer-readable instructions, when executed by one or more processors, causing the one or more processors to perform the steps of the method for accessing an application.

A computer device is provided, including a memory and a processor, the memory storing computer readable instructions. When executing the computer readable instructions, the processor is configured to perform: obtaining an application access request, the application access request carrying a user identifier and an application identifier, the application identifier corresponding to the application that is to be accessed; acquiring an encryption key, and encrypting the user identifier by using the encryption key, to obtain an encrypted user identifier, the encryption key carrying first key information and second key information; generating an authorization credential corresponding to the application access request according to the encrypted user identifier and the first key information; transmitting the authorization credential to the application that is to be accessed, the application that is to be accessed generating an authorization request based on the authorization credential; receiving the authorization request returned by the application that is to be accessed; and accessing, when a detection result of the authorization request satisfies a preset condition, the application that is to be accessed based on the detection result and the second key information.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

An embodiment of this application provides an application access system, and the application access system may include a terminal and a server. An application access apparatus may be specifically integrated in the server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence (AI) platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

Figure 1A:
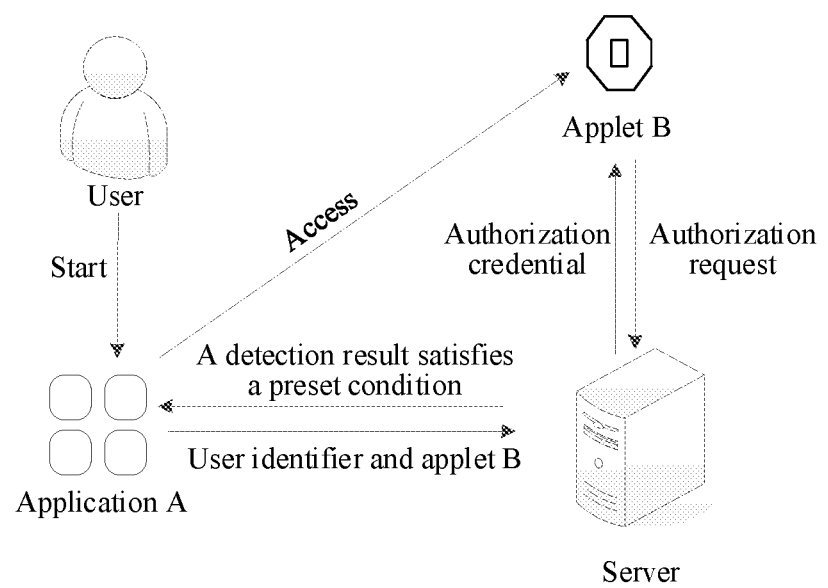
FIG. 1a is a schematic diagram of a scenario of a method for accessing an application according to an embodiment of this application.

For example, referring to FIG. 1a, the application access apparatus is integrated on the server, and a user may start an application A of instant messaging. If the user wants to access a third-party application through the application A, for example, access an applet B, the server may obtain an application access request of the user for the application A, where the application access request carries a user identifier and the application that is to be accessed (the applet B). The server may then acquire an encryption key, and encrypt the user identifier by using the encryption key, to obtain an encrypted user identifier, the encryption key carrying first key information and second key information. Next, the server may generate an authorization credential corresponding to the application access request according to the encrypted user identifier and the first key information; transmit the authorization credential to the application that is to be accessed, so that the application that is to be accessed generates an authorization request based on the authorization credential; receive the authorization request returned by the application that is to be accessed; detecting the authorization request; and access, when a detection result satisfies a preset condition, the application that is to be accessed based on the detection result and the second key information.

In this solution, after the user identifier is encrypted, the first key information is used as a part of the authorization credential and transmitted to the application that is to be accessed, so that the application that is to be accessed generates the authorization request based on the authorization credential. The authorization request returned by the application that is to be accessed is then received. The authorization request is detected, and when the detection result satisfies the preset condition, the application that is to be accessed is accessed based on the detection result and the second key information. In other words, whether the third-party application is accessed is determined according to the detection result. In addition, when the third-party application is accessed, the encrypted user identifier needs to be decrypted by using the first key information and the second key information. If the third-party application is maliciously attacked by criminals, the criminals can only steal the first key information, but cannot decrypt the encrypted user identifier to steal personal information of the user. Therefore, this solution can improve the security of application access.

Detailed descriptions are separately provided below. A description order of the following embodiments is not construed as a limitation on a preferred order of the embodiments.

A method for accessing an application is provided, including: obtaining an application access request; acquiring an encryption key, and encrypting the user identifier by using the encryption key, to obtain an encrypted user identifier; generating an authorization credential corresponding to the application access request according to the encrypted user identifier and the first key information; transmitting the authorization credential to the application that is to be accessed, so that the application that is to be accessed generates an authorization request based on the authorization credential; receiving the authorization request returned by the application that is to be accessed; and accessing, when a detection result of the authorization request satisfies a preset condition, the application that is to be accessed based on the detection result and the second key information.

Figure 1B:
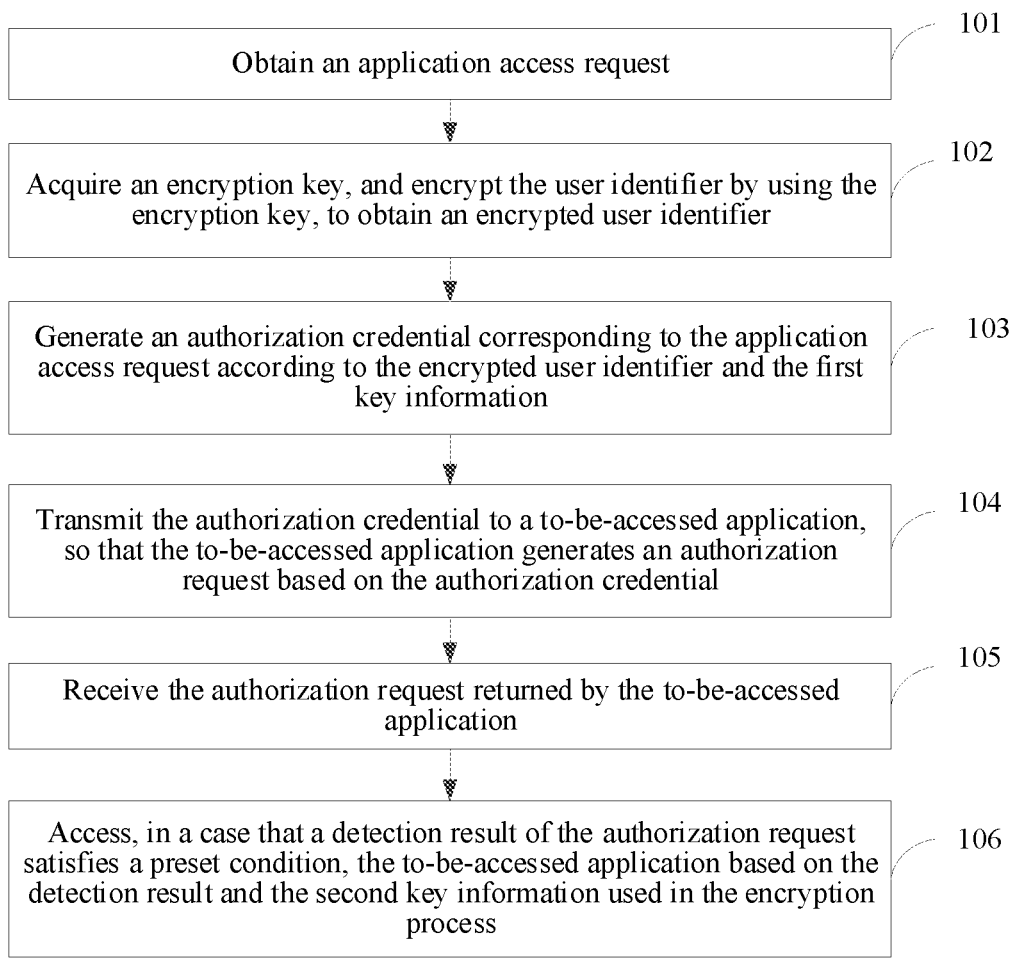
FIG. 1b is a schematic flowchart of a method for accessing an application according to an embodiment of this application.

FIG. 1b is a schematic flowchart of a method for accessing an application according to an embodiment of this application. This embodiment is mainly described using an example in which the method is applied to an electronic device. The electronic device may be specifically a server. A specific process of the method for accessing an application may be as follows:

101: Obtain an application access request.

The application access request carries a user identifier and an application identifier. An application corresponding to the application identifier is the application that is to be accessed, and the application access request may be triggered by the user. For example, the user clicks on a link, and the link may start the application that is to be accessed. The user identifier may include an account and an avatar of the user, or the like.

102: Acquire an encryption key, and encrypt the user identifier by using the encryption key, to obtain an encrypted user identifier.

Figure 1C:
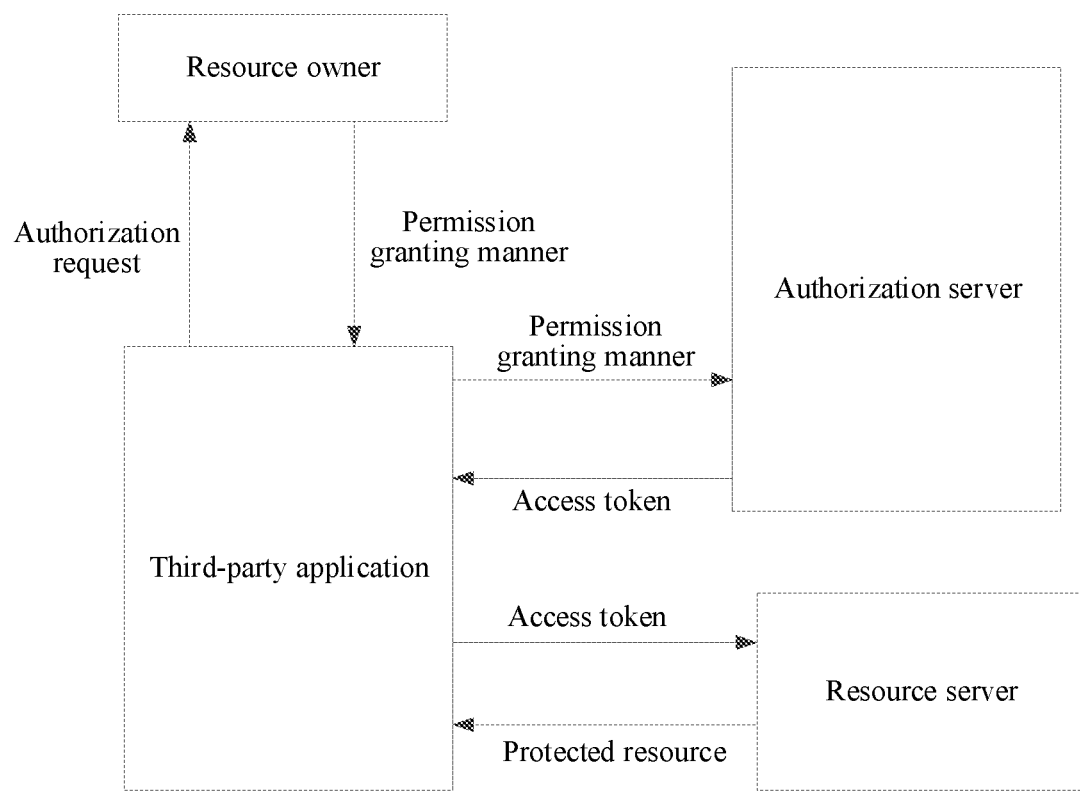
FIG. 1c is a schematic diagram of an architecture of an Open Authorization (OAuth) protocol.
Figure 1D:
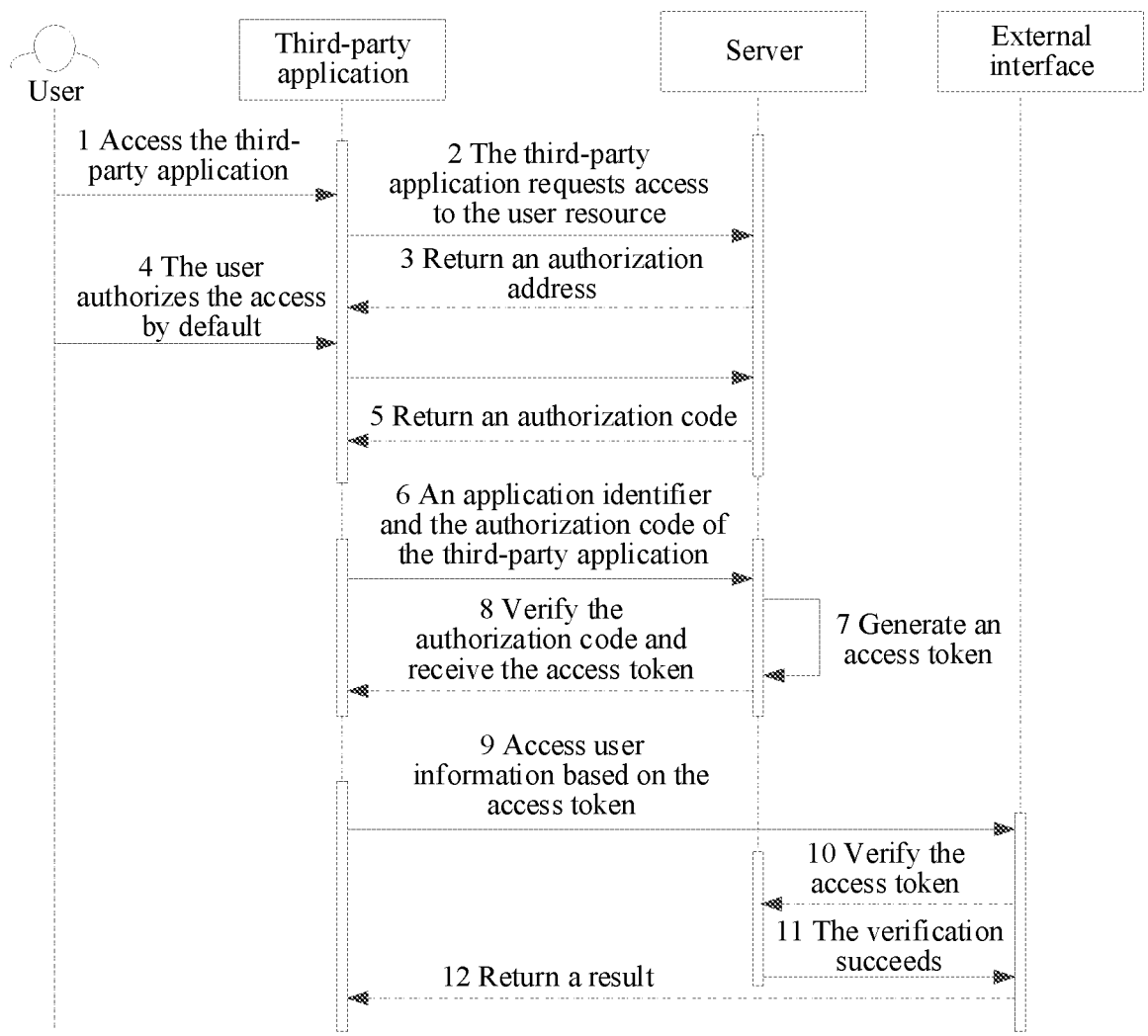
FIG. 1d is an interaction flowchart of the OAuth protocol.

To ensure the security of user data, the electronic device may encrypt the user identifier. The encryption key carries first key information and second key information. In this embodiment of this application, the application that is to be accessed may be accessed based on an Open Authorization (OAuth) protocol. The OAuth protocol is described herein. The OAuth protocol provides a secure, open, and simple standard for the authorization of a user resource. Different from the conventional authorization method, the authorization of OAuth does not allow a third-party application (an application that is to be accessed) to touch account information (for example, a user name and a password) of the user, that is, the third-party application can request for authorization of the user resource without using the user name of the user and the password. The architecture of the OAuth protocol is shown in FIG. 1c. A resource owner refers to the user. An authorization server is a server specially used by the service provider to process authorization and store resources generated by the user. The authorization server may be the same as or different from an authentication server. After receiving a method for permission granting, the third-party application obtains an access token from the authorization server according to the permission granting method. The third-party application then obtains a protected resource (for example, the user name of the user) corresponding to the authorization request from the resource server according to the obtained access token. Further, referring to FIG. 1d, when the user accesses the third-party application through instant messaging software, the third-party application applies to the server to access the user resource, and the authorization server returns an authorization address to the third-party application. When the third-party application receives an authorization code returned by the server, an application identifier and the authorization code of the third-party application are transmitted to the server, so that the server verifies the authorization code and returns the authorization code to the third-party application. The third-party application then accesses user information based on the access token. After the verification of the access token by the server succeeds, the third-party application receives the resource authorized by the user through an external interface. Specifically, to ensure the security of user data, the user identifier may be encrypted by using the encryption key. The first key information and the second key information are different, and the encryption key may be calculated based on an encryption algorithm, the first key information, and the second key information.

In some embodiments, before the step of "acquiring an encryption key", the method may further include:
(11) Obtain an encryption algorithm and a plurality of pieces of key information;
(12) Select two pieces of key information from the plurality of pieces of key information, to obtain the first key information and the second key information; and
(13) Construct the encryption key for encryption based on the encryption algorithm, the first key information, and the second key information.

For example, the electronic device may obtain an encryption algorithm and 10 different key information from a local database; randomly select two pieces of key information from the 10 different key information, to obtain the first key information and the second key information; and finally, calculate the encryption key for encryption based on the encryption algorithm, the first key information, and the second key information.

103: Generate an authorization credential corresponding to the application access request according to the encrypted user identifier and the first key information.

For example, specifically, the electronic device may generate, based on the encrypted user identifier, authorization information used for accessing the application that is to be accessed; and generate the authorization credential corresponding to the application access request by using the authorization information and the first key information.

In some embodiments, the step of "generating an authorization credential corresponding to the application access request according to the encrypted user identifier and the first key information" may further include:
(21) Generate, based on the encrypted user identifier, authorization information used for accessing the application that is to be accessed; and
(22) Generate the authorization credential corresponding to the application access request by using the authorization information and the first key information.

In this embodiment, the electronic device may add the first key information to the authorization information, to obtain the authorization credential corresponding to the application access request. In other words, even if the application that is to be accessed is maliciously attacked by criminals, the criminals can only steal the first key information, but cannot decrypt the encrypted user identifier to steal personal information of the user. Therefore, this solution can improve the security of application access.

104: Transmit the authorization credential to the application that is to be accessed, so that the application that is to be accessed generates an authorization request based on the authorization credential.

The electronic device may transmit the authorization credential to the application that is to be accessed based on a transmission protocol, so that the application that is to be accessed generates an authorization request based on the authorization credential. The transmission protocol may include a socket transmission protocol, a world wide web transmission protocol, and a hypertext transmission protocol, depending on the actual situation. In the process of transmitting the authorization credential to the application that is to be accessed, the authorization credential carries the first key information. In addition, the electronic device retains the second key information in a local database. The local database may be an encrypted local database. In other words, even if criminals obtain the first key information through unauthorized means, they cannot decrypt the encrypted user identifier. Moreover, the second key information is stored in the encrypted local database, which further improves the security of user privacy, thereby improving the security of application access.

105: Receive the authorization request returned by the application that is to be accessed.

106: Access, when a detection result of the authorization request satisfies a preset condition, the application that is to be accessed based on the detection result and the second key information.

For example, specifically, the electronic device may detect the authorization request, and when a detection result satisfies a preset condition, the electronic device may obtain the first key information from the application that is to be accessed, and then access the application that is to be accessed based on the detection result, the first key information, and the second key information.

In some embodiments, the step of "accessing, when a detection result satisfies a preset condition, the application that is to be accessed based on the detection result and the second key information" may further include:
- (31) Obtain the first key information from the application that is to be accessed when the detection result satisfies the preset condition; and
- (32) Access the application that is to be accessed according to the detection result, the first key information, and the second key information.

For example, specifically, the electronic device may detect a type of the application that is to be accessed based on the authorization request; determine that the detection result satisfies the preset condition when the type of the application that is to be accessed is an authorized application type; and then access the application that is to be accessed based on the detection result and the second key information.

In some embodiments, the step of "accessing, when a detection result satisfies a preset condition, the application that is to be accessed based on the detection result and the second key information" includes:
- (41) Extract the application identifier of the application that is to be accessed from the detection result;
- (42) Verify the application that is to be accessed based on the application identifier; and
- (43) Determine that the detection result satisfies the preset condition when a verification result indicates that the application that is to be accessed is an authorized application, and obtain the first key information from the application that is to be accessed.

For example, specifically, after obtaining the application identifier of the application that is to be accessed, the electronic device may query whether the application identifier has corresponding authentication information in the local database. When the application identifier has corresponding authentication information in the local database, it is determined that the application that is to be accessed is an authorized application, that is, the detection result satisfies the preset condition. In this case, the first key information may be obtained from the application that is to be accessed, and the application that is to be accessed may be accessed based on the second key information and the detection result.

In some embodiments, the step of "accessing the application that is to be accessed according to the detection result, the first key information, and the second key information" includes:
- (51) Calculate, according to the first key information and the second key information, the encryption key used for encrypting the user identifier; and
- (52) Access the application that is to be accessed according to the encryption key and the detection result.

In this application, the encryption key may be calculated by using the first key information and the second key information. It may be understood that this application uses a symmetric encryption method. In a symmetric encryption algorithm, a data sender processes a plaintext (the user identifier) and the encryption key by using a special encryption algorithm to obtain a complex encrypted ciphertext (the encrypted user identifier) and transmit the encrypted ciphertext. After receiving the ciphertext, to interpret the original text, a recipient (the third-party application) needs to decrypt the ciphertext using the encryption key and an inverse algorithm of the same algorithm, to restore the ciphertext to a readable plaintext. In the symmetric encryption algorithm, only one key is used, and both the sender and the receiver use this key to encrypt and decrypt data, which requires the decryption party to learn of the encryption key in advance. In this application, after the user identifier is encrypted, the encrypted user identifier and the first key information in the encryption process are transmitted to the application that is to be accessed. That is, partial key information of the encryption key is transmitted to the application that is to be accessed. If the application that is to be accessed is maliciously attacked by criminals, the criminals can only steal the first key information, but cannot decrypt the encrypted user identifier to steal personal information of the user. Therefore, this solution can improve the security of application access.

Further, the electronic device may extract the encrypted user identifier and the authorization credential from the detection result, and decrypt the encrypted user identifier according to the encryption key. Specifically, the electronic device may decrypt the encrypted user identifier using the encryption key and the inverse algorithm of the algorithm used during the encryption; and finally, access the application that is to be accessed based on a decryption result and the authorization credential.

In some embodiments, the step of "accessing the application that is to be accessed according to the encryption key and the detection result" may further include:
- (61) Extract the encrypted user identifier and the authorization credential from the detection result;
- (62) Decrypt the encrypted user identifier according to the encryption key; and
- (63) Access the application that is to be accessed based on a decryption result and the authorization credential.

The decryption result may be the user identifier. A resource node for authorized data is determined based on the user identifier and the authorization credential, such as a resource node for avatar data, a resource node for nickname data and/or a resource node for mobile phone number data. The resource node verifies the authorization credential based on an authentication algorithm, and verifies whether requested access content matches authorization information in the authorization credential. If the access content matches the authorization information in the authorization credential, the application that is to be accessed is accessed.

The type of the application that is to be accessed is detected based on the authorization request. It is determined that the detection result does not satisfy the preset condition when the type of the application that is to be accessed is not an authorized application type. In this case, the application that is to be accessed is not accessed.

In some embodiments, the method for accessing an application provided in this application may further include: skipping accessing the application that is to be accessed when the detection result does not satisfy the preset condition.

According to this embodiment of this application, an application access request is first obtained, the application access request carrying a user identifier and the application that is to be accessed. An encryption key is acquired, and the user identifier is encrypted by using the encryption key, to obtain an encrypted user identifier, the encryption key carrying first key information and second key information. An authorization credential corresponding to the application access request is generated according to the encrypted user identifier and the first key information. The authorization credential is then transmitted to the application that is to be accessed, so that the application that is to be accessed generates an authorization request based on the authorization credential. Next, the authorization request returned by the application that is to be accessed is received. Finally, the authorization request is detected, and when a detection result satisfies a preset condition, the application that is to be accessed is accessed based on the detection result and the second key information. In this solution, after the user identifier is encrypted, the first key information is used as a part of the authorization credential and transmitted to the application that is to be accessed, so that the application that is to be accessed generates the authorization request based on the authorization credential. The authorization request returned by the application that is to be accessed is then received. The authorization request is detected, and when the detection result satisfies the preset condition, the application that is to be accessed is accessed based on the detection result and the second key information. In other words, whether the third-party application is accessed is determined according to the detection result. In addition, when the third-party application is accessed, the encrypted user identifier needs to be decrypted by using the first key information and the second key information. If the third-party application is maliciously attacked by criminals, the criminals can only steal the first key information, but cannot decrypt the encrypted user identifier to steal personal information of the user. Therefore, this solution can improve the security of application access.

According to the method described in the embodiments, the following further provides detailed descriptions by using examples.

In this embodiment, a description is made by taking an example in which the application access apparatus is specifically integrated in a server.

Figure 2A:
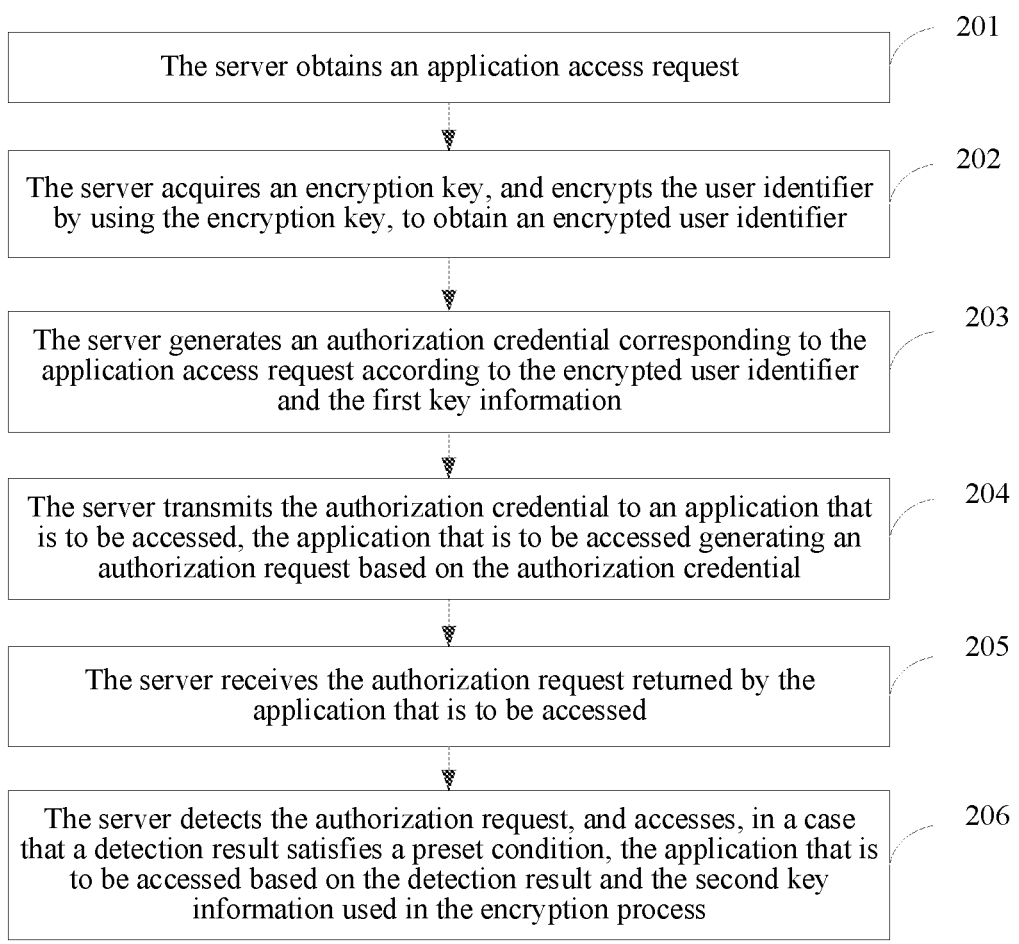
FIG. 2a is another schematic flowchart of a method for accessing an application according to an embodiment of this application.

Referring to FIG. 2a, a specific process of a method for accessing an application may be as follows:

201: A server obtains an application access request.

The application access request carries a user identifier and an application identifier, and the application access request may be triggered by the user. For example, a page of an application A is displayed on a display screen of a terminal. The page includes a control key for jumping to a third-party application (that is, the application that is to be accessed). When the user clicks on the control key, the server may obtain an application access request triggered by the user.

202: The server acquires an encryption key, and encrypt the user identifier by using the encryption key, to obtain an encrypted user identifier.

The encryption key carries first key information and second key information. Specifically, the server may encrypt the user identifier by using the encryption key, and then perform step 203.

203: The server generates an authorization credential corresponding to the application access request according to the encrypted user identifier and the first key information.

Specifically, the server generates, based on the encrypted user identifier, authorization information used for accessing the application that is to be accessed; and generates the authorization credential corresponding to the application access request by using the authorization information and the first key information.

In this embodiment, the server may add the first key information to the authorization information, to obtain the authorization credential corresponding to the application access request. In other words, even if the application that is to be accessed is maliciously attacked by criminals, the criminals can only steal the first key information, but cannot decrypt the encrypted user identifier to steal personal information of the user. Therefore, this solution can improve the security of application access. In addition, the first key information may be further used as an access parameter to call a corresponding application interface.

204: The server transmits the authorization credential to the application that is to be accessed, so that the application that is to be accessed generates an authorization request based on the authorization credential.

205: The server receives the authorization request returned by the application that is to be accessed.

206: The server detects the authorization request, and accesses, when a detection result satisfies a preset condition, the application that is to be accessed based on the detection result and the second key information.

For example, specifically, the server may detect a type of the application that is to be accessed based on the authorization request; and determine that the detection result satisfies the preset condition when the type of the application that is to be accessed is an authorized application type. The server then extracts the encrypted user identifier and the authorization credential from the detection result, and decrypts the encrypted user identifier according to the encryption key. Specifically, the server may decrypt the encrypted user identifier using the encryption key and the inverse algorithm of the algorithm used during the encryption; and finally, access the application that is to be accessed based on a decryption result and the authorization credential.

The server according to this embodiment of this application first obtains an application access request, the application access request carrying a user identifier and the application that is to be accessed. The server acquires an encryption key, and encrypts the user identifier by using the encryption key, to obtain an encrypted user identifier. The server generates an authorization credential corresponding to the application access request according to the encrypted user identifier and first key information. The server then transmits the authorization credential to the application that is to be accessed, so that the application that is to be accessed generates an authorization request based on the authorization credential. Next, the server receives the authorization request returned by the application that is to be accessed. Finally, the server detects the authorization request, and accesses, when a detection result satisfies a preset condition, the application that is to be accessed based on the detection result and second key information. In this solution, after the user identifier is encrypted, the first key information is used as a part of the authorization credential and transmitted to the application that is to be accessed, so that the application that is to be accessed generates the authorization request based on the authorization credential. The authorization request returned by the application that is to be accessed is then received. The authorization request is detected, and when the detection result satisfies the preset condition, the application that is to be accessed is accessed based on the detection result and the second key information. In other words, whether the third-party application is accessed is determined according to the detection result. In addition, when the third-party application is accessed, the encrypted user identifier needs to be decrypted by using the first key information and the second key information. If the third-party application is maliciously attacked by criminals, the criminals can only steal the first key information, but cannot decrypt the encrypted user identifier to steal personal information of the user. Therefore, this solution can improve the security of application access.

Figure 2B:
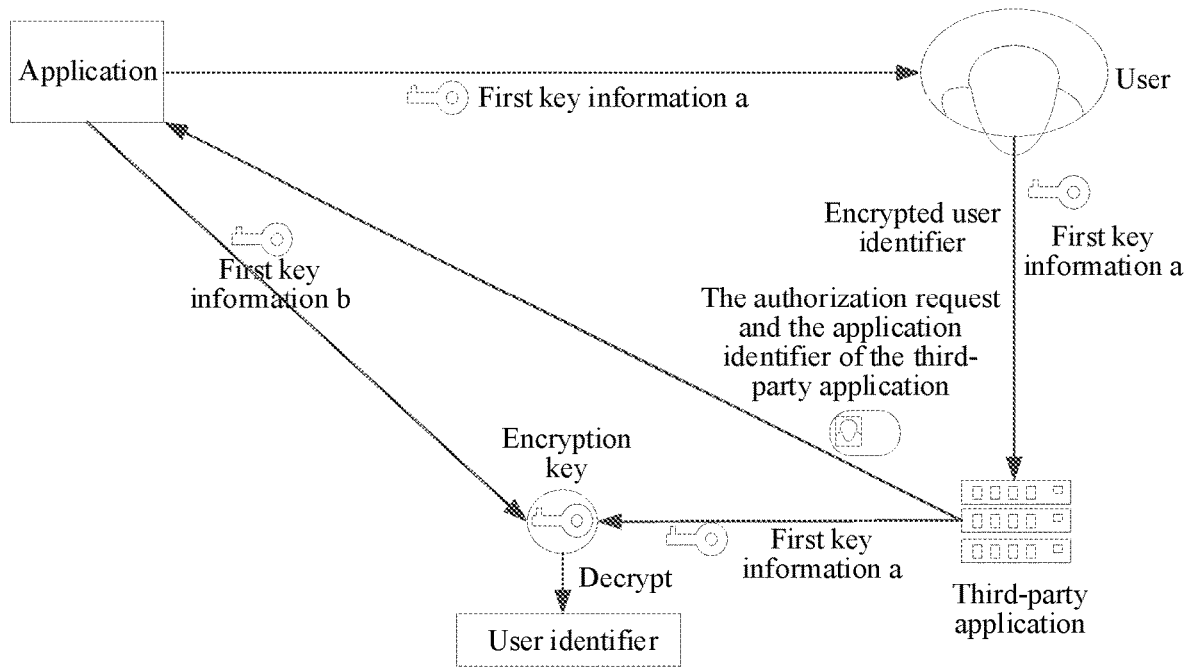
FIG. 2b is a schematic diagram of another scenario of a method for accessing an application according to an embodiment of this application.
Figure 2C:
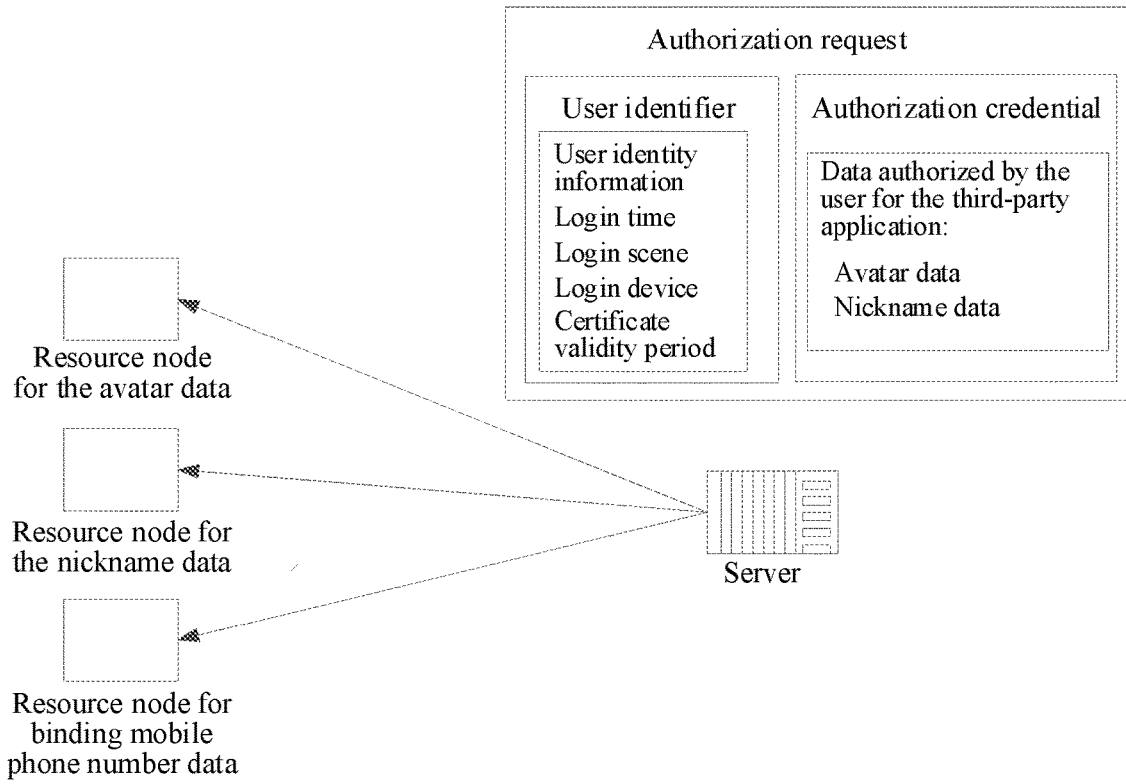
FIG. 2c is a schematic diagram of accessing a third-party application by using a method for accessing an application according to an embodiment of this application.

To facilitate the understanding of the method for accessing an application provided in the embodiments of this application, referring to FIG. 2b, an example is used in which the user calls the third-party application through an instant messaging application (an application for short below). A server of the application obtains the application access request triggered by the user, and the specific process is as follows:

In a user authorization stage, the server generates first key information a and second key information b. The server calculates the first key information a, the second key information b, and a digest algorithm according to the algorithm to obtain the encryption key. The server then encrypts the user identifier based on the encryption key, and generates the authorization credential corresponding to the application access request according to the encrypted user identifier and the first key information a. The server then transmits the authorization credential to a third-party application, so that the third-party application generates an authorization request based on the authorization credential. In the user authorization stage, since the server transmits the first key information a to the third-party application, and the server saves the second key information b locally, this design avoids the security risks caused by directly handing the authorization credential to the third party, and enhances the storage security. For example, malicious access by internal employees can be avoided. In the stage of accessing the user data by the third-party application, the server needs to verify the application that is to be accessed. When a verification result indicates that the application that is to be accessed is an authorized application, the server provides the second key information b, and calculates the encryption key based on the first key information a and the second key information b. The server then decrypts the encrypted user identifier by using the encryption key and the inverse algorithm of the algorithm used during the encryption. Finally, the server accesses the third-party application based on a decryption result and the authorization credential. The authorization credential and the application identifier of the third-party application flow with the authorization request, and the server determines the resource node to be accessed according to the authorization credential in the authorization request and the user identifier. For example, the user identifier carries the avatar data and the nickname data of the user, and the server may access the resource nodes for the avatar data and the nickname data according to the user identifier. Since the user identifier does not carry the mobile phone number data of the user, the server cannot access the resource node bound with the mobile phone number data according to the user identifier, as shown in FIG. 2c.

In an access control stage, the server performs authentication and verification on the authorization request, checks whether the data currently accessed is authorized by the user, and rejects the request if unauthorized data access is found. In other words, whether the third-party application is accessed is determined according to the detection result. In addition, when the third-party application is accessed, the encrypted user identifier needs to be decrypted by using the first key information and the second key information. If the third-party application is maliciously attacked by criminals, the criminals can only steal the first key information, but cannot decrypt the encrypted user identifier to steal personal information of the user. Therefore, this solution can improve the security of application access.

Although the steps in the flowcharts of the embodiments are displayed sequentially according to instructions of arrows, these steps are not necessarily performed sequentially according to a sequence instructed by the arrows. Unless otherwise explicitly specified in this specification, execution of the steps is not strictly limited, and the steps may be performed in other orders. Moreover, at least some of the steps in the foregoing embodiments may include a plurality of sub-steps or a plurality of stages. The sub-steps or the stages are not necessarily performed at the same moment, but may be performed at different moments. The sub-steps or the stages are not necessarily performed in sequence, but may be performed in turn or alternately with another step or at least some of sub-steps or stages of the another step.

To better implement the method for accessing an application provided in the embodiments of this application, an embodiment of this application further provides an application access apparatus (an access apparatus for short) based on the foregoing method for accessing an application. Terms have meanings the same as those in the foregoing method for accessing an application, and for specific implementation details, reference may be made to the description in the method embodiments.

Figure 3A:
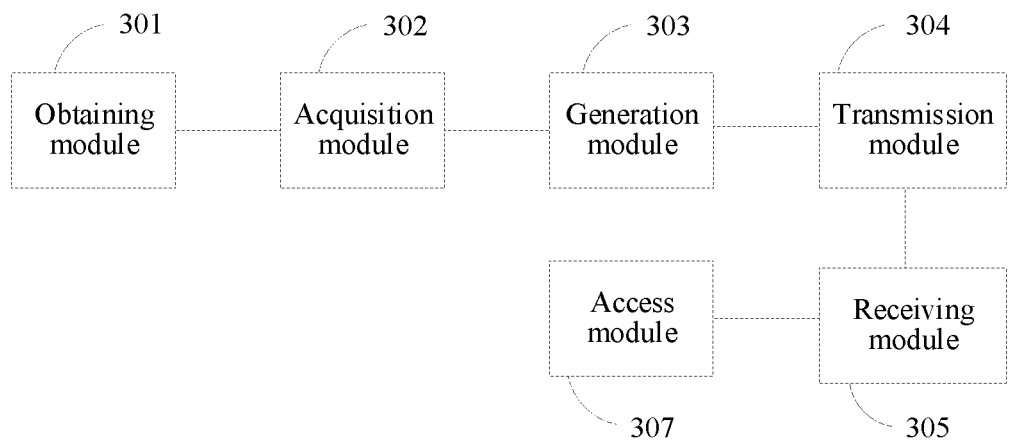
FIG. 3a is a schematic structural diagram of an application access apparatus according to an embodiment of this application.

FIG. 3a is a schematic structural diagram of an application access apparatus according to an embodiment of this application. The application access apparatus includes an obtaining module 301, an acquisition module 302, a generation module 303, a transmission module 304, a receiving module 305, and an access module 307. The modules included in the application access apparatus may all or partially be implemented by software, hardware, or a combination thereof.

The obtaining module 301 is configured to obtain an application access request.

The application access request carries a user identifier and an application identifier. The application access request may be triggered by the user. For example, the user clicks on a link, and the link may start the application that is to be accessed. The user identifier may include an account and an avatar of the user, or the like.

The acquisition module 302 is configured to acquire an encryption key, and encrypt the user identifier by using the encryption key, to obtain an encrypted user identifier.

To ensure the security of user data, the acquisition module 302 may encrypt the user identifier, where the encryption key carries first key information and second key information. The first key information and the second key information are different, and the encryption key may be calculated based on an encryption algorithm, the first key information, and the second key information.

Figure 3B:
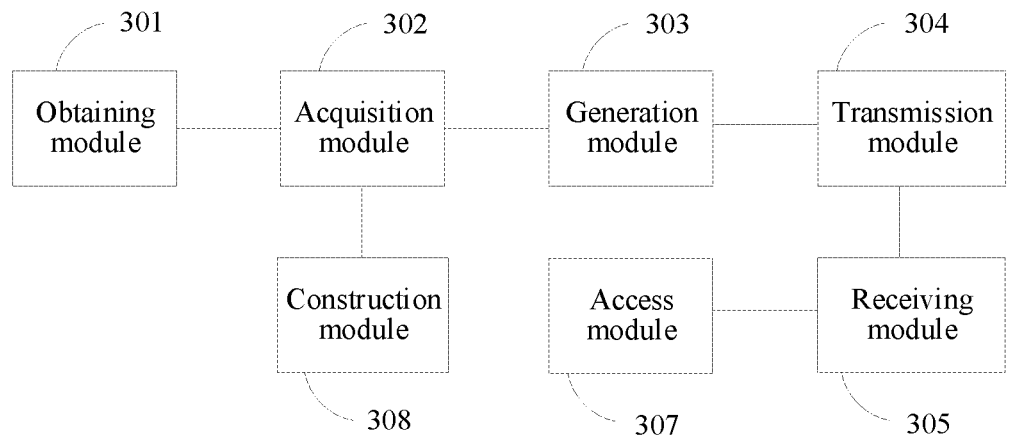
FIG. 3b is another schematic structural diagram of an application access apparatus according to an embodiment of this application.

In some embodiments, referring to FIG. 3b, the access apparatus may further include a construction module 308. The construction module 308 is further configured to: obtain an encryption algorithm and a plurality of pieces of key information; select two pieces of key information from the plurality of pieces of key information, to obtain the first key information and the second key information; and construct the encryption key for encryption based on the encryption algorithm, the first key information, and the second key information.

The generation module 303 is configured to encrypt the user identifier, and generate an authorization credential corresponding to the application access request according to the encrypted user identifier and the first key information.

For example, specifically, the generation module 303 may encrypt the user identifier by using the encryption key. The generation module 303 then generates, based on the encrypted user identifier, authorization information used for accessing the application that is to be accessed. Finally, the generation module 303 generates the authorization credential corresponding to the application access request by using the authorization information and the first key information.

In some embodiments, the generation module 303 may be further configured to: generate, based on the encrypted user identifier, authorization information used for accessing the application that is to be accessed; and generate the authorization credential corresponding to the application access request by using the authorization information and the first key information.

In this embodiment, the first key information may be added to the authorization information, to obtain the authorization credential corresponding to the application access request. In other words, even if the application that is to be accessed is maliciously attacked by criminals, the criminals can only steal the first key information, but cannot decrypt the encrypted user identifier to steal personal information of the user. Therefore, this solution can improve the security of application access.

The transmission module 304 is configured to transmit the authorization credential to the application that is to be accessed corresponding to the application identifier, so that the application that is to be accessed generates an authorization request based on the authorization credential.

The receiving module 305 is configured to receive the authorization request returned by the application that is to be accessed.

The access module 307 is configured to access, when a detection result of the authorization request satisfies a preset condition, the application that is to be accessed based on the detection result and the second key information.

Figure 3C:
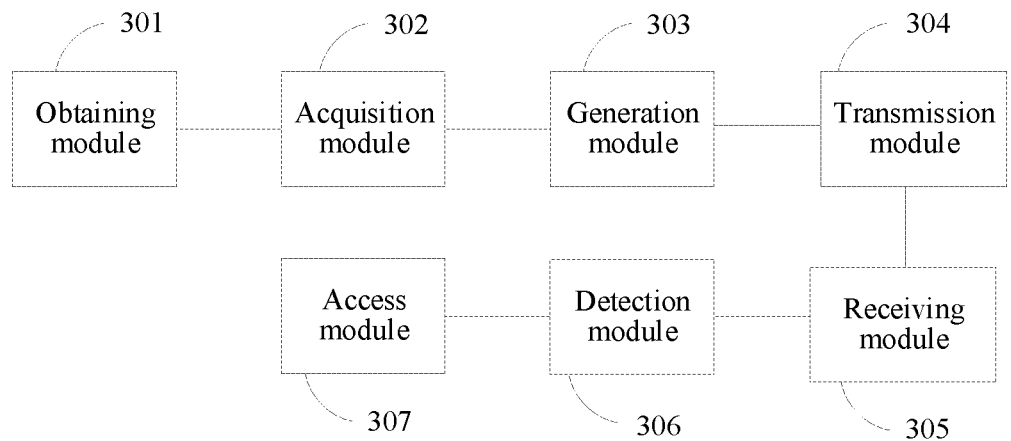
FIG. 3c is another schematic structural diagram of an application access apparatus according to an embodiment of this application.

In some embodiments, referring to FIG. 3*c*, the access apparatus may further include a detection module 306, configured to detect the authorization request.

For example, specifically, a type to which the application that is to be accessed belongs may be detected based on the authorization request.

In some embodiments, the access module 307 may further include: an obtaining unit, configured to obtain the first key information from the application that is to be accessed when the detection result satisfies the preset condition; and an access unit, configured to access the application that is to be accessed according to the detection result, the first key information, and the second key information.

In some embodiments, the access unit may further include: a calculation subunit, configured to calculate, according to the first key information and the second key information, the encryption key used for encrypting the user identifier; and an access subunit, configured to access the application that is to be accessed according to the encryption key and the detection result.

In some embodiments, the access subunit is further configured to: extract the encrypted user identifier and the authorization credential from the detection result; decrypt the encrypted user identifier according to the encryption key; and access the application that is to be accessed based on a decryption result and the authorization credential.

In some embodiments, the obtaining unit is further configured to: extract the application identifier of the application that is to be accessed from the detection result; verify the application that is to be accessed based on the application identifier; and determine that the detection result satisfies the preset condition when a verification result indicates that the application that is to be accessed is an authorized application, and obtain the first key information from the application that is to be accessed.

In some embodiments, the access module is further configured to skip accessing the application that is to be accessed when the detection result does not satisfy the preset condition.

According to this embodiment of this application, the obtaining module 301 obtains an application access request, the application access request carrying a user identifier and the application that is to be accessed; the acquisition module 302 acquires an encryption key, and encrypts the user identifier by using the encryption key, to obtain an encrypted user identifier, the encryption key carrying first key information and second key information; and the generation module 303 encrypts the user identifier, and generates an authorization credential corresponding to the application access request according to the encrypted user identifier and the first key information. The transmission module 304 then transmits the authorization credential to the application that is to be accessed, so that the application that is to be accessed generates an authorization request based on the authorization credential. Next, the receiving module 305 receives the authorization request returned by the application that is to be accessed. Finally, the detection module 306 detects the authorization request, and the access module 307 accesses, when a detection result satisfies a preset condition, the application that is to be accessed based on the detection result and the second key information. In this solution, after the user identifier is encrypted, the first key information is used as a part of the authorization credential and transmitted to the application that is to be accessed, so that the application that is to be accessed generates the authorization request based on the authorization credential. The authorization request returned by the application that is to be accessed is then received. The authorization request is detected, and when the detection result satisfies the preset condition, the application that is to be accessed is accessed based on the detection result and the second key information. In other words, whether the third-party application is accessed is determined according to the detection result. In addition, when the third-party application is accessed, the encrypted user identifier needs to be decrypted by using the first key information and the second key information. If the third-party application is maliciously attacked by criminals, the criminals can only steal the first key information, but cannot decrypt the encrypted user identifier to steal personal information of the user. Therefore, this solution can improve the security of application access.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 4:
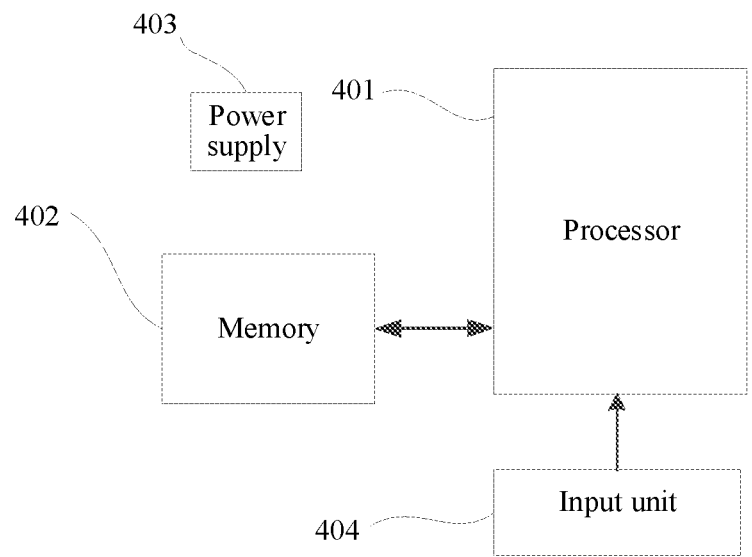
FIG. 4 is a schematic structural diagram of an electronic device according to an embodiment of this application.

In addition, an embodiment of this application further provides an electronic device. FIG. 4 is a schematic structural diagram of an electronic device according to an embodiment of this application. Specifically, the electronic device may include components such as a processor 401 with one or more processing cores, a memory 402 with one or more computer-readable storage media, a power supply 403, and an input unit 404. A person skilled in the art may understand that the electronic device structure shown in FIG. 4 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. In some embodiments, the processor 401 may include one or more processing cores. Preferably, the processor 401 may integrate an application processor and a modem. The application processor mainly processes an operating system, a user interface, an application, and the like. The modem mainly processes wireless communication. It may be understood that the foregoing modem processor may alternatively not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application required by at least one function (for example, a sound playback function and an image playback function), or the like. The data storage area may store data created according to use of the electronic device. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. Preferably, the power supply 403 may be logically connected to the processor 401 by using a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 in the electronic device may load executable files corresponding to processes of one or more applications to the memory 402 according to the following instructions, and the processor 401 runs the application stored in the memory 402, to implement various functions as follows:

obtaining an application access request; acquiring an encryption key, and encrypting the user identifier by using the encryption key, to obtain an encrypted user identifier; generating an authorization credential corresponding to the application access request according to the encrypted user identifier and the first key information; transmitting the authorization credential to the application that is to be accessed, so that the application that is to be accessed generates an authorization request based on the authorization credential; receiving the authorization request returned by the application that is to be accessed; detecting the authorization request; and accessing, when a detection result satisfies a preset condition, the application that is to be accessed based on the detection result and the second key information.

For specific implementation of the foregoing operations, reference may be made to the foregoing embodiments. Details are not described herein again.

According to this embodiment of this application, an application access request is first obtained, the application access request carrying a user identifier and the application that is to be accessed. An encryption key is acquired, and the user identifier is encrypted by using the encryption key, to obtain an encrypted user identifier. An authorization credential corresponding to the application access request is generated according to the encrypted user identifier and first key information. The authorization credential is then transmitted to the application that is to be accessed, so that the application that is to be accessed generates an authorization request based on the authorization credential. Next, the authorization request returned by the application that is to be accessed is received. Finally, the authorization request is detected, and when a detection result satisfies a preset condition, the application that is to be accessed is accessed based on the detection result and second key information. In this solution, after the user identifier is encrypted, the first key information is used as a part of the authorization credential and transmitted to the application that is to be accessed, so that the application that is to be accessed generates the authorization request based on the authorization credential. The authorization request returned by the application that is to be accessed is then received. The authorization request is detected, and when the detection result satisfies the preset condition, the application that is to be accessed is accessed based on the detection result and the second key information. In other words, whether the third-party application is accessed is determined according to the detection result. In addition, when the third-party application is accessed, the encrypted user identifier needs to be decrypted by using the first key information and the second key information. If the third-party application is maliciously attacked by criminals, the criminals can only steal the first key information, but cannot decrypt the encrypted user identifier to steal personal information of the user. Therefore, this solution can improve the security of application access.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

In an embodiment, a computer device is provided, including a memory and a processor, the memory storing a computer program, the computer program, when executed by the processor, causing the processor to perform the steps in the foregoing method embodiments.

In an embodiment, a computer-readable storage medium is provided, storing a computer program, the computer program, when being executed by a processor, causing the processor to perform the steps in the foregoing method embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

According to the foregoing descriptions of the implementations, a person skilled in the art may readily understand that the exemplary implementations and the modules and units described herein may be implemented by using software, or may be implemented by combining software and necessary hardware. Therefore, the technical solutions of the embodiments and the modules and units thereof of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments, and the modules and units thereof, of this application.

A person of ordinary skill in the art may understand that all or some of the procedures of the methods in the foregoing embodiments may be implemented by a computer program instructing related hardware. The program may be stored in a non-volatile computer-readable storage medium. When the program runs, the procedures of the foregoing method embodiments may be performed. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only show several implementations of this application, and descriptions thereof are in detail, but are not to be understood as a limitation to the patent scope of this application. A person of ordinary skill in the art may further make several variations and improvements without departing from the ideas of this application, and such variations and improvements all fall within the protection scope of this application. Therefore, the protection scope of this application is subject to the protection scope of the appended claims.

What is claimed is:

1. A method for accessing an application, performed by an electronic device, the method comprising:
  obtaining an application access request, the application access request carrying a user identifier and an application identifier, the application identifier corresponding to the application that is to be accessed;
  acquiring an encryption key, and encrypting the user identifier by using the encryption key, to obtain an encrypted user identifier, the encryption key carrying first key information and second key information;
  generating an authorization credential corresponding to the application access request according to the encrypted user identifier and the first key information;
  transmitting the authorization credential to the application that is to be accessed, the application that is to be accessed generating an authorization request based on the authorization credential;
  receiving the authorization request returned by the application that is to be accessed; and
  accessing, when a detection result of the authorization request satisfies a preset condition, the application that is to be accessed based on the detection result and the second key information.

2. The method according to claim 1, wherein the accessing, when a detection result of the authorization request satisfies a preset condition, the application that is to be accessed based on the detection result and the second key information comprises:
  obtaining the first key information from the application that is to be accessed when the detection result of the authorization request satisfies the preset condition; and
  accessing the application that is to be accessed according to the detection result, the first key information, and the second key information.

3. The method according to claim 2, wherein the accessing the application that is to be accessed according to the detection result, the first key information, and the second key information comprises:
  calculating, according to the first key information and the second key information, the encryption key used for encrypting the user identifier; and
  accessing the application that is to be accessed according to the encryption key and the detection result.

4. The method according to claim 3, wherein the accessing the application that is to be accessed according to the encryption key and the detection result comprises:
  extracting the encrypted user identifier and the authorization credential from the detection result;
  decrypting the encrypted user identifier according to the encryption key; and
  accessing the application that is to be accessed based on a decryption result and the authorization credential.

5. The method according to claim 2, wherein the obtaining the first key information from the application that is to be accessed when the detection result of the authorization request satisfies the preset condition comprises:
  extracting the application identifier of the application that is to be accessed from the detection result;
  verifying the application that is to be accessed based on the application identifier; and
  determining that the detection result satisfies the preset condition when a verification result indicates that the application that is to be accessed is an authorized application, and obtaining the first key information from the application that is to be accessed.

6. The method according to claim 1, wherein the generating an authorization credential corresponding to the application access request according to the encrypted user identifier and the first key information comprises:
generating, based on the encrypted user identifier, authorization information used for accessing the application that is to be accessed; and
generating the authorization credential corresponding to the application access request by using the authorization information and the first key information.

7. The method according to claim 1, wherein before the acquiring an encryption key, the method further comprises:
obtaining an encryption algorithm and a plurality of pieces of key information;
selecting two pieces of key information from the plurality of pieces of key information, to obtain the first key information and the second key information; and
constructing the encryption key for encryption based on the encryption algorithm, the first key information, and the second key information.

8. The method according to claim 1, wherein the method further comprises:
skipping accessing the application that is to be accessed when the detection result of the authorization request does not satisfy the preset condition.

9. An application access apparatus, comprising a memory and a processor, the memory storing computer-readable instructions, wherein when executing the computer-readable instructions, the processor is configured to:
obtain an application access request, the application access request carrying a user identifier and an application identifier, the application identifier corresponding an application that is to be accessed;
acquire an encryption key, and encrypt the user identifier by using the encryption key, to obtain an encrypted user identifier, the encryption key carrying first key information and second key information;
generate an authorization credential corresponding to the application access request according to the encrypted user identifier and the first key information;
transmit the authorization credential to the application that is to be accessed, the application that is to be accessed generating an authorization request based on the authorization credential;
receive the authorization request returned by the application that is to be accessed; and
access, when a detection result of the authorization request satisfies a preset condition, the application that is to be accessed based on the detection result and the second key information.

10. The apparatus according to claim 9, wherein the processor is further configured to:
obtain the first key information from the application that is to be accessed when the detection result of the authorization request satisfies the preset condition; and
access the application that is to be accessed according to the detection result, the first key information, and the second key information.

11. The apparatus according to claim 10, wherein the processor is further configured to:
calculate, according to the first key information and the second key information, the encryption key used for encrypting the user identifier; and
access the application that is to be accessed according to the encryption key and the detection result.

12. The apparatus according to claim 11, wherein the processor is further configured to extract the encrypted user identifier and the authorization credential from the detection result; decrypt the encrypted user identifier according to the encryption key; and access the application that is to be accessed based on a decryption result and the authorization credential.

13. The apparatus according to claim 10, wherein the processor is further configured to extract the application identifier of the application that is to be accessed from the detection result; verify the application that is to be accessed based on the application identifier; and determine that the detection result satisfies the preset condition when a verification result indicates that the application that is to be accessed is an authorized application, and obtain the first key information from the application that is to be accessed.

14. The apparatus according to claim 9, wherein the processor is further configured to generate, based on the encrypted user identifier, authorization information used for accessing the application that is to be accessed; and generate the authorization credential corresponding to the application access request by using the authorization information and the first key information.

15. The apparatus according to claim 9, wherein the processor is further configured to obtain an encryption algorithm and a plurality of pieces of key information; select two pieces of key information from the plurality of pieces of key information, to obtain the first key information and the second key information; and construct the encryption key for encryption based on the encryption algorithm, the first key information, and the second key information.

16. The apparatus according to claim 9, wherein the processor is further configured to skip accessing the application that is to be accessed when the detection result of the authorization request does not satisfy the preset condition.

17. A non-transitory storage medium storing computer-readable instructions, the computer-readable instructions, when executed by one or more processors, causing the one or more processors to perform:
Obtaining an application access request, the application access request carrying a user identifier and an application identifier, the application identifier corresponding an application that is to be accessed;
acquiring an encryption key, and encrypting the user identifier by using the encryption key, to obtain an encrypted user identifier, the encryption key carrying first key information and second key information;
generating an authorization credential corresponding to the application access request according to the encrypted user identifier and the first key information;
transmitting the authorization credential to an application that is to be accessed, the application that is to be accessed generating an authorization request based on the authorization credential;
receiving the authorization request returned by the application that is to be accessed; and
accessing, when a detection result of the authorization request satisfies a preset condition, the application that is to be accessed based on the detection result and the second key information.

18. The non-transitory storage medium according to claim 17, wherein the accessing, when a detection result of the authorization request satisfies a preset condition, the application that is to be accessed based on the detection result and the second key information comprises:
obtaining the first key information from the application that is to be accessed when the detection result of the authorization request satisfies the preset condition; and accessing the application that is to be accessed according to the detection result, the first key information, and the second key information.

19. The non-transitory storage medium according to claim 18, wherein the accessing the application that is to be accessed according to the detection result, the first key information, and the second key information comprises:
calculating, according to the first key information and the second key information, the encryption key used for encrypting the user identifier; and
accessing the application that is to be accessed according to the encryption key and the detection result.

20. The non-transitory storage medium according to claim 19, wherein the accessing the application that is to be accessed according to the encryption key and the detection result comprises:
extracting the encrypted user identifier and the authorization credential from the detection result;
decrypting the encrypted user identifier according to the encryption key; and
accessing the application that is to be accessed based on a decryption result and the authorization credential.

* * * * *